US009327826B2

(12) United States Patent
Nieman (10) Patent No.: US 9,327,826 B2
(45) Date of Patent: May 3, 2016

(54) SELF-CENTERING AIRCRAFT FLAP POSITION COMMAND APPARATUS

(71) Applicant: Cessna Aircraft Company, Wichita, KS (US)

(72) Inventor: Ronald J. Nieman, Colwich, KS (US)

(73) Assignee: TEXTRON INNOVATIONS INC., Providence, RI (US)

(*) Notice: Subject to any disclaimer, the term of this patent is extended or adjusted under 35 U.S.C. 154(b) by 398 days.

(21) Appl. No.: 13/660,729

(22) Filed: Oct. 25, 2012

(65) Prior Publication Data

US 2014/0116194 A1 May 1, 2014

(51) Int. Cl.
*B64C 13/04* (2006.01)

(52) U.S. Cl.
CPC ............ *B64C 13/04* (2013.01); *Y10T 74/20612* (2015.01)

(58) Field of Classification Search
CPC ........ B64C 13/04; B64C 13/08; B64C 13/14; G05G 5/05; G05G 5/06; G05G 1/04
See application file for complete search history.

(56) References Cited

U.S. PATENT DOCUMENTS

| | | | |
|---|---|---|---|
| 1,987,066 A * | 1/1935 | Kingston | 244/234 |
| 2,417,691 A | 3/1947 | Kelley et al. | |
| 3,736,810 A | 6/1973 | Fernandez | |
| 4,154,415 A | 5/1979 | Harris et al. | |
| 4,393,730 A | 7/1983 | Randall | |
| 4,533,096 A | 8/1985 | Baker et al. | |
| 6,382,045 B1 * | 5/2002 | Wheeler | F16H 61/24 74/473.12 |
| 6,804,586 B2 * | 10/2004 | Richter et al. | 244/89 |
| 2010/0078525 A1 * | 4/2010 | Kummle | 244/236 |

OTHER PUBLICATIONS

Chinese Patent Application 201310508321.8 Office Action with Concise Explanation dated Jun. 2, 2015, 12 pages.

* cited by examiner

*Primary Examiner* — Tien Dinh
*Assistant Examiner* — Richard R Green
(74) *Attorney, Agent, or Firm* — Lathrop & Gage LLP (57) ABSTRACT

An apparatus for controlling positioning of flaps in an aircraft includes a shift lever movable to each of a plurality of shift lever positions to control positioning of the flaps of the aircraft to each of a respective plurality of associated flap positions. A shift lever indexing plate includes a plurality of engagement positions associated with the plurality of shift lever positions, respectively, the shift lever being coupled to an engagement member, the engagement member moving with the shift lever and being biased to selectively engage a selected one of the plurality of the engagement positions associated with a selected one of the shift lever positions to command the aircraft flaps to the flap position associated with the selected one of the shift lever positions. The shift lever indexing plate includes a web portion which separates the engagement positions of the shift lever indexing plate, the web portion and the shift lever being shaped and the shift lever being biased such that when the shift lever is at rest and only the shift lever bias is applied to the shift lever, the engagement member must be engaged with one of the plurality of engagement positions of the shift lever indexing plate.

16 Claims, 6 Drawing Sheets

VIEW A-A

VIEW A-A

*FIG. 3*

VIEW A-A

FIG. 4

VIEW A-A

FIG. 5

FIG. 6

SELF-CENTERING AIRCRAFT FLAP POSITION COMMAND APPARATUS

BACKGROUND

1. Technical Field

This disclosure relates to aircraft control systems and, more particularly, to systems used to command aircraft flap positions.

2. Discussion of Related Art

In some aircraft, it is common to control the position of wing flaps using a flap handle-command module. The module is typically located in the center pedestal in the cockpit of the aircraft. In some aircraft, the aircraft flaps can be controlled to occupy one of four possible positions from completely retracted or "UP" to completely extended or "FULL", with the four possible positions being ordered as follows: UP-1-2-FULL. The four positions are associated with and are commanded by four respective positions of a shifter lever in the flap handle-command module. The shifter lever is connected to a flap knob, which is accessed by the pilot to position the shifter lever and, therefore, the aircraft flaps, in one of the four possible positions.

A drawback to conventional flap knobs and shifter levers is that they do not readily obtain one of the four possible positions. As a result, with conventional flap handle-command modules, when pilots wish to change the position of the aircraft flaps, they are required to "hunt" with the flap knob and shifter lever for the desired position. This puts undo work load on the pilots, and requires a degree of extra effort.

SUMMARY

According to one aspect, an apparatus for controlling positioning of flaps in an aircraft is provided. A shift lever is movable to each of a plurality of shift lever positions to control positioning of the flaps of the aircraft to each of a respective plurality of associated flap positions. A shift lever indexing plate includes a plurality of engagement positions associated with the plurality of shift lever positions, respectively, the shift lever being coupled to an engagement member. The engagement member moves with the shift lever and is biased to selectively engage a selected one of the plurality of the engagement positions associated with a selected one of the shift lever positions to command the aircraft flaps to the flap position associated with the selected one of the shift lever positions. The shift lever indexing plate further comprises a web portion which separates the engagement positions of the shift lever indexing plate. The web portion and the shift lever are shaped and the shift lever is biased such that when the shift lever is at rest and only the shift lever bias is applied to the shift lever, the engagement member must be engaged with one of the plurality of engagement positions of the shift lever indexing plate.

According to another aspect, an apparatus for controlling positioning of flaps in an aircraft is provided. A shift lever is movable to each of a plurality of shift lever positions to control positioning of the flaps of the aircraft to each of a respective plurality of associated flap positions. A shift lever indexing plate includes a plurality of engagement positions associated with the plurality of shift lever positions, respectively, the shift lever being coupled to an engagement member. The engagement member moves with the shift lever and is biased to selectively engage a selected one of the plurality of the engagement positions associated with a selected one of the shift lever positions to command the aircraft flaps to the flap position associated with the selected one of the shift lever positions. The shift lever indexing plate further comprises a web portion which separates the engagement positions of the shift lever indexing plate. The web portion of the shift lever indexing plate comprises a protrusion which interferes with the shift lever to prevent the shift lever from moving directly from a first shift lever position to a second shift lever position adjacent to the first shift lever position.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions, objects and features may be exaggerated for clarity.

DETAILED DESCRIPTION

Figure 1:
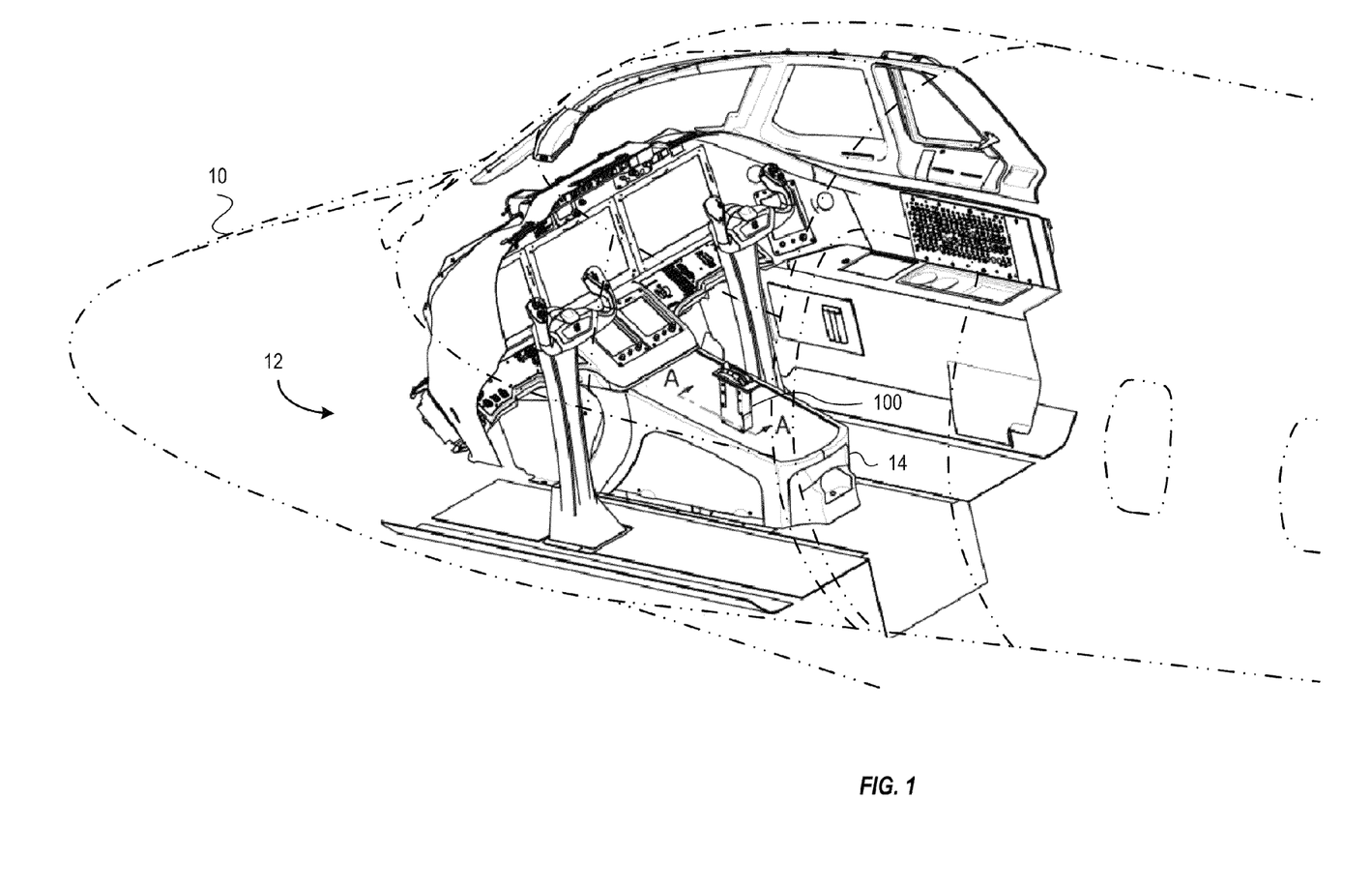
FIG. 1 includes a schematic partially cut-away perspective view of a portion of a cockpit of an aircraft having a center pedestal in which a flap position handle-command module is located.

FIG. 1 includes a schematic partially cut-away perspective view of a portion of a cockpit 12 of an aircraft 10 having a center pedestal 14 in which a flap position handle-command module 100, according to some exemplary embodiments, is located. Referring to FIG. 1, the flap position handle-command module 100 drops into center pedestal 14 as a self-contained module.

Figure 2:
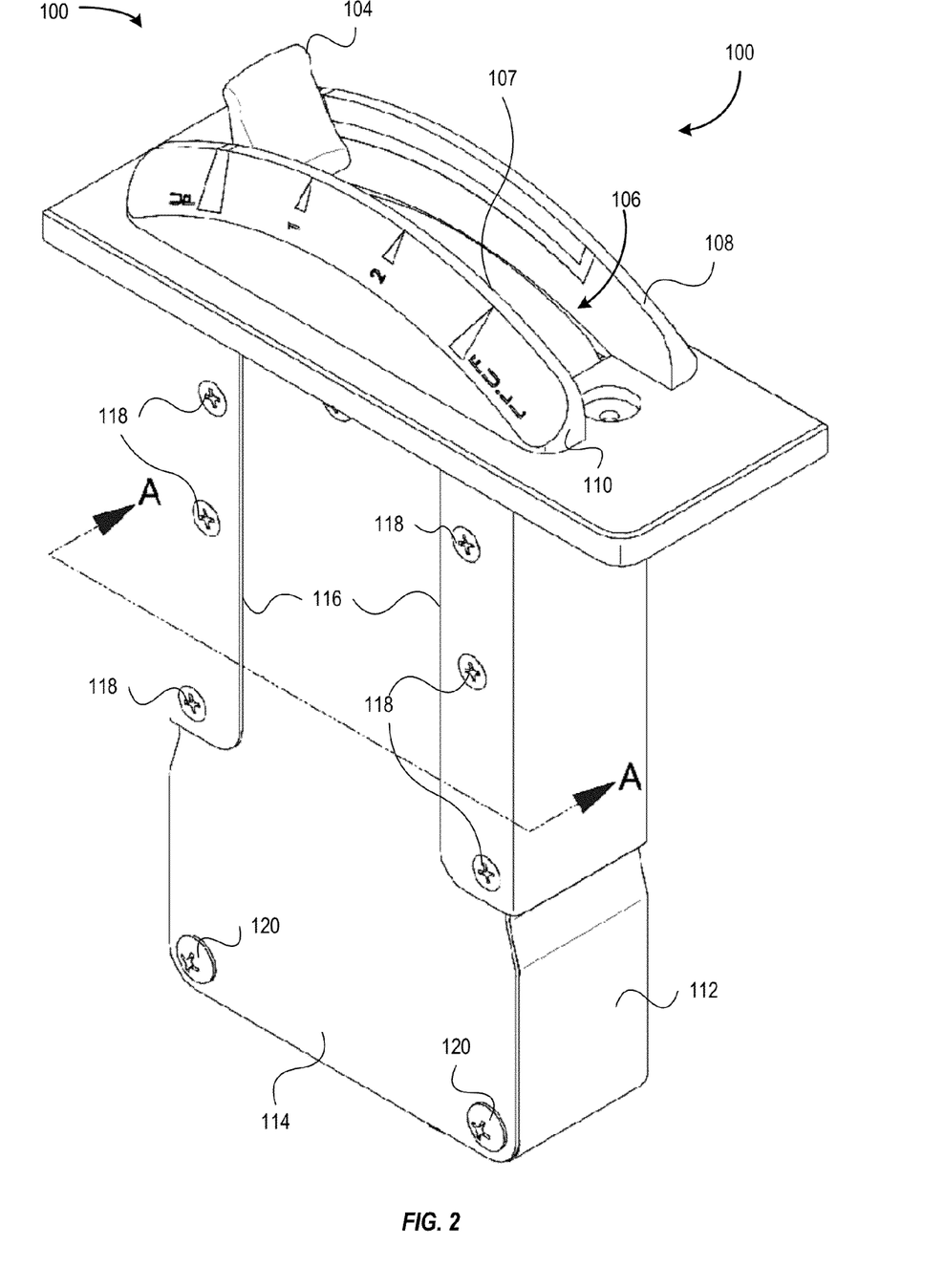
FIG. 2 includes a schematic perspective detailed view of the flap position handle-command module illustrated in FIG. 1, according to some exemplary embodiments.

FIG. 2 includes a schematic perspective detailed view of the flap position handle-command module 100 illustrated in FIG. 1, removed from center pedestal 14, according to some exemplary embodiments. Referring to FIG. 2, module 100 includes a housing 112 fixed to a flange 102, by which module 100 is mountable in center pedestal 14. Housing 112 is covered by a housing cover plate 114, which is fixed to housing 112 by screws 120. Wrap-around covers or shrouds 116 are fixed in place over housing cover plate 114 by screws 118.

Module 100 is used to command the aircraft flaps to the various possible flap positions. As shown in FIG. 2, in these particular exemplary embodiments, there are four possible flap positions, namely, "UP" or fully retracted, "FULL" or fully extended, position "1" being the first position beyond UP or fully retracted, and position "2" being the second to last position, immediately before "FULL" or fully extended. It will be understood that the present disclosure is applicable to aircraft having any number of flap positions, not only aircraft having four flap positions. To command the flaps to the various positions, a flap knob 104 is moved within a flap knob slot 106 defined between a first flap knob slot side 108 and a second flap knob slot side 110. The vertical opening into the interior of module 100 in the bottom of slot 106 is covered with a slot cover 107 which is carried into motion and moves with flap knob 104 as flap knob 104 moves.

Although not illustrated in FIG. 2, the motion of flap knob 104 is controlled by a detent system, as described herein in detail in connection with exemplary embodiments, such that once it is set at one of the positions, e.g., UP-1-2-FULL, it is captured at that position until moved out of that position by the user, i.e., pilot. To move flap knob 104, the user/pilot depresses flap knob 104 down into slot 106 against a mechanical bias, such as a mechanical bias provided by a compression spring, to free flap knob 104 from its present position, then moves flap knob 104 to a new desired position, then releases flap knob 104 such that flab knob 104 reengages in accordance with the detent system according to exemplary embodiments described herein in detail, such that flap knob 104 and, therefore, the flaps of the aircraft, occupy a new stationary position.

Figure 3:
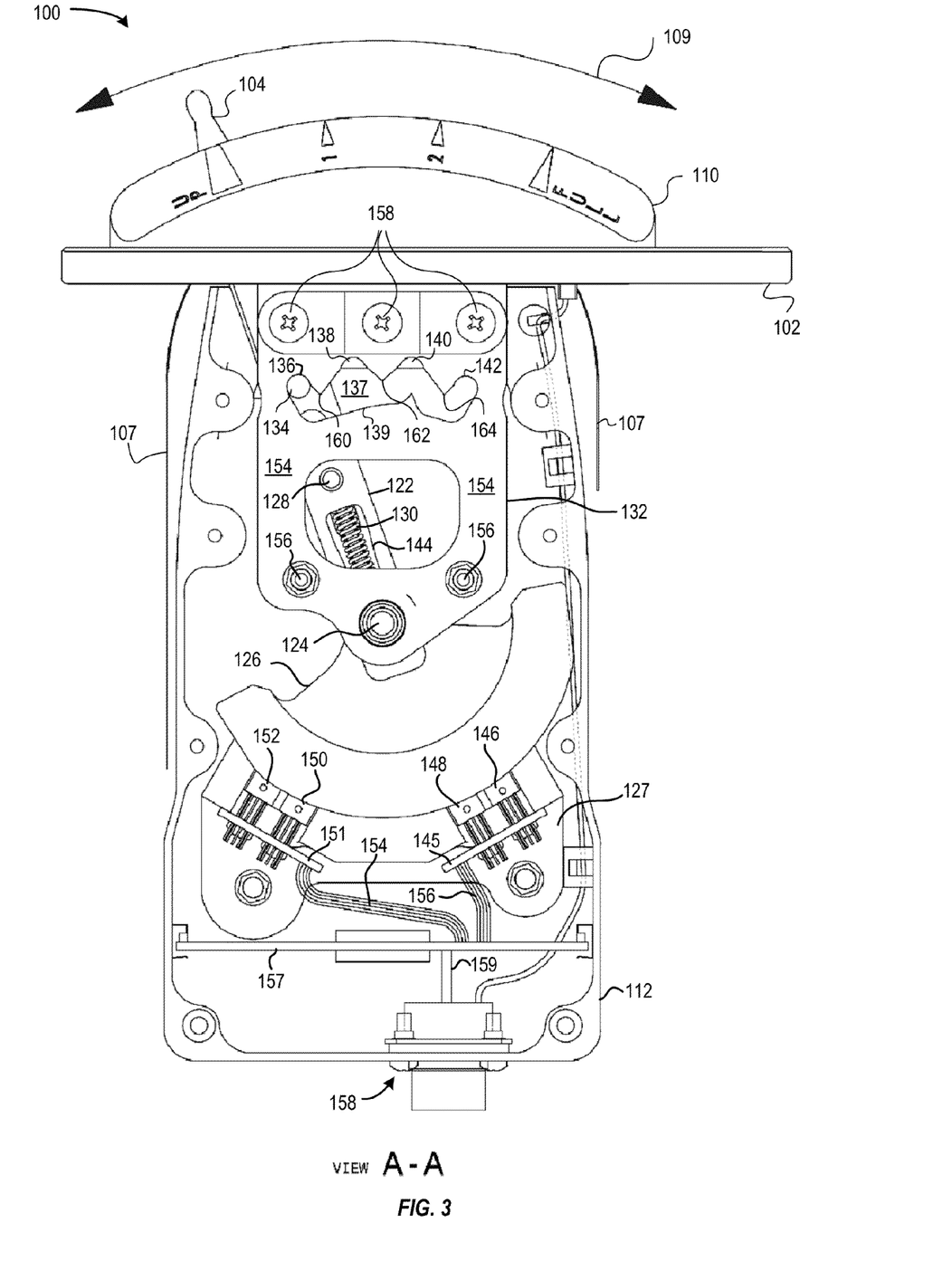
FIG. 3 includes a schematic cross-sectional diagram taken along line A-A of FIG. 2, with the module set such that the aircraft flaps are in the UP or fully retracted position, according to some exemplary embodiments.

FIG. 3 is a schematic cross-sectional diagram taken along line A-A of FIG. 2, with the module 100 set such that the aircraft flaps are in the UP or fully retracted position, according to some exemplary embodiments. Referring to FIG. 3, as shown, flap knob 104 is mechanically connected to a shifter lever 122 which carries an engagement pin 134, which is stationary with respect to shifter lever 122. Module 100 also includes a detent plate assembly 132, which includes multiple, in this exemplary embodiment, four, engagement grooves, 136, 138, 140, 142, which define the engagement positions of shifter lever 122 and, therefore, the four flap positions of the aircraft flaps. Shifter lever 122 is biased by compression spring 130, which is attached in stationary relation between pivot pin 124 and a shift pin 128. Compression spring 130 biases shifter lever 122 and engagement pin 134 into an engaged position, in which engagement pin 134 is forced into and held in engagement with one of engagement grooves 136, 138, 140, 142.

As noted above, in the exemplary illustrating of FIG. 3, the aircraft flaps are in the FULL position. As a result, engagement pin 134 is held in engagement with engagement groove 142 of detent plate assembly 132, since engagement groove 142 is associated with the FULL aircraft flaps position. Similarly, engagement groove 140 is associated with aircraft flaps position 2, such that, when engagement pin 134 is in engagement with engagement groove 140, the aircraft flaps will be commanded to flaps position 2. Similarly, engagement groove 138 is associated with aircraft flaps position 1, such that, when engagement pin 134 is in engagement with engagement groove 138, the aircraft flaps will be commanded to flaps position 1. Similarly, engagement groove 136 is associated with aircraft flaps position UP, such that, when engagement pin 134 is in engagement with engagement groove 136, the aircraft flaps will be commanded to flaps position UP.

When a releasing force is applied to flap knob 104 and flap knob 104 is sufficiently depressed against the bias force of compression spring 130, engagement pin 134 is removed from engagement with one of engagement grooves 136, 138, 140, 142 such that flap knob 104 can be moved into rotation within knob slot 106 as indicated by arrow 109. When shifter lever 122 is moved, it pivots about pivot pin 124, carrying engagement pin 134 into motion with shifter lever 122. When the releasing force is removed from flap knob 104, compression spring 130 biases engagement pin 134 back into engagement with one of engagement grooves 136, 138, 140, 142, depending upon the position of shifter lever 122 when the releasing force is removed. As a result, the aircraft flaps are moved to a new position commanded by the new position of shifter lever 122.

The position of the shifter lever 122 is sensed to determine the flap position command to be sent to the aircraft flaps such that the aircraft flaps are set to the position commanded by the user/pilot. The position of shifter lever 122 is sensed using a combination of a beam blocker 126, sensor mount 127, and two pairs of sensing switches 146 (SW1), 148 (SW2), 150 (SW3), and 152 (SW4), mounted on opposite sides of sensor mount 127, as shown. Beam blocker 126 is mechanically coupled to shifter lever 122 at shift pin 128 and pivot pin 124 and pivots about pivot pin 124 along with shifter lever 122 when flap knob 104 is moved as described above in detail. However, when flap knob 104 is depressed or released, allowing shifter lever 122 to move longitudinally, beam blocker 126 does not move with shifter lever 122 because pivot pin 124 slides within a slot 144 formed in shifter lever 122, and shift pin 128 slides within a slot formed in beam blocker 126.

Beam blocker 126 and optical sensors SW1, SW2, SW3, SW4 sense the position of shifter lever 122 and generate electrical signals used to command the aircraft flaps to the position required by the user/pilot via flap knob 104. The electrical signals generated by switches SW1, SW2, SW3, SW4 are routed through circuit boards 145, 151, cable harnesses 156, 154, printed circuit board 157, cable 159 and out of module 100 via electrical connector system 158 for further processing to develop the flap commands required to place the flaps as required by the user/pilot.

As described above, module 100 also includes a detent plate assembly 132, which includes multiple, in this exemplary embodiment, four, engagement grooves, 136, 138, 140, 142, which define the engagement positions of shifter lever 122 and, therefore, the four flap positions of the aircraft flaps. Detent plate assembly 132 is held in position by screws and nuts 156 and 158. It includes a web portion 154 and an opening portion 137. The opening portion defines engagement grooves 136, 138, 140, 142 at which engagement pin 134 engages to hold shifter lever 122 in one of the four possible positions. The web portion 154 defines the portions of detent plate assembly surrounding and between the engagement grooves 136, 138, 140, 142, including a flat section opposite engagement grooves 136, 138. It will be noted that, according to exemplary embodiments, web portion 154 includes pointed and sloped portions 160, 162 and 164 between engagement grooves 136, 138, 140, 142. As a result, when releasing force is removed from flap knob 104 such that compression spring 130 applies biasing force to shifter lever 122, engagement pin 134 is forced into one of engagement grooves 136, 138, 140, 142, without the need for any further action by the user/pilot. That is, the combination of the pointed and sloped shape of web portion of detent plate assembly 132 between grooves 136, 138, 140, 142 and the bias force supplied by compression spring 130 ensures that engagement pin 134 will engage one of engagement grooves 136, 138, 140, 142, such that flap knob 104 and shifter lever 122 will automatically center on one of the flap positions, i.e., one of the aircraft flap positions is automatically commanded, without the need for the user/pilot to "hunt" for a shifter lever position to drop into.

Web portion 154 of detent plate assembly 132 also includes a safety protrusion 117, which prevents the user/pilot from moving directly into the FULL position without first stopping at the 2 position. This is a safety feature which prevents the aircraft flaps from being placed in the fully extended position from any position other than the position immediately adjacent to the fully extended position.

Figure 4:
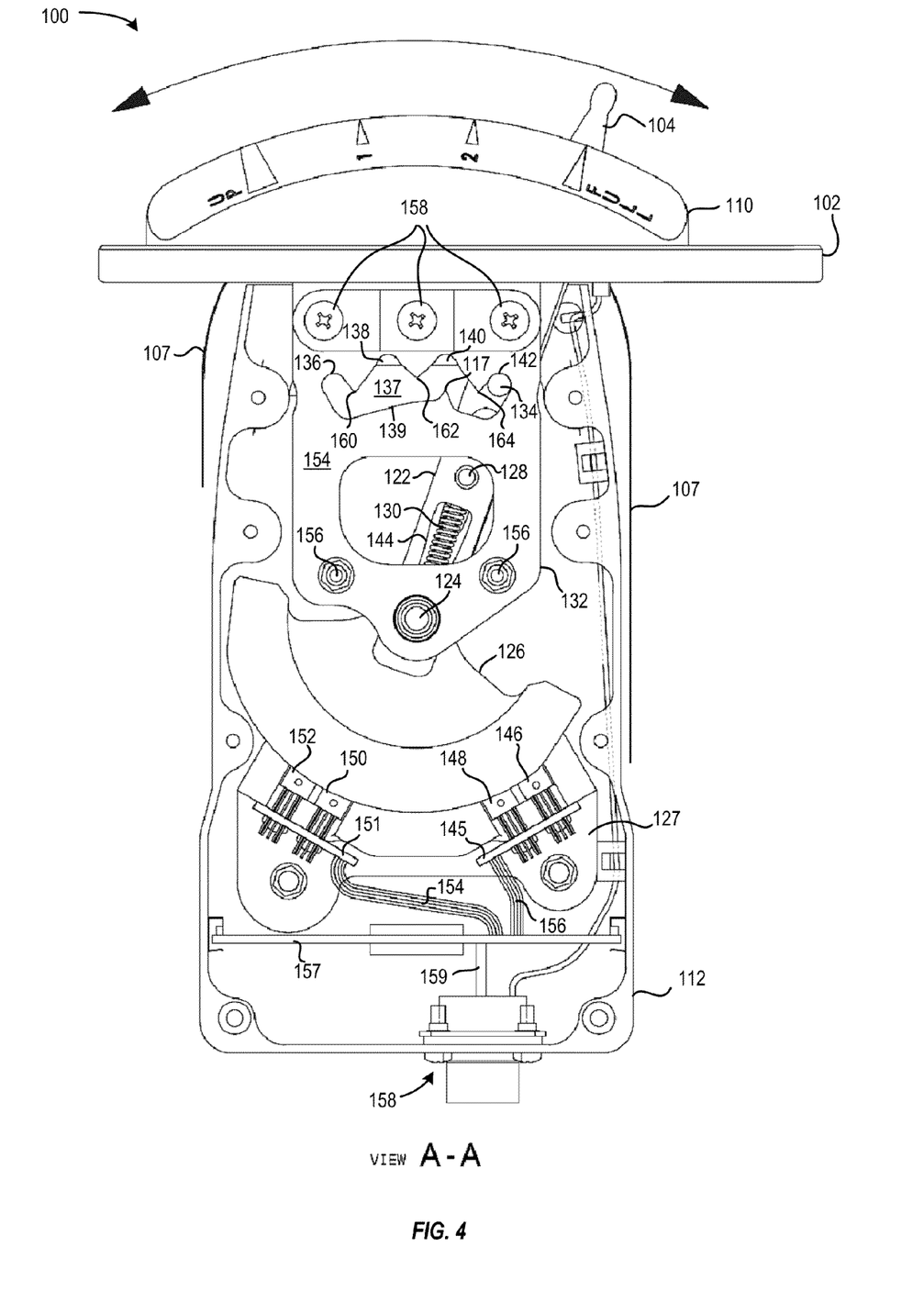
FIG. 4 includes a schematic cross-sectional diagram taken along line A-A of FIG. 2, with the module set such that the aircraft flaps are in the FULL or fully extended position, according to some exemplary embodiments.

FIG. 4 is a schematic cross-sectional diagram taken along line A-A of FIG. 2, with the module set such that the aircraft flaps are in the FULL or fully extended position, according to some exemplary embodiments. All of the elements of FIG. 4 are the same as those of FIG. 3, as indicted by the like reference numerals. Accordingly, detailed description of those like elements will not be repeated.

Figure 5:
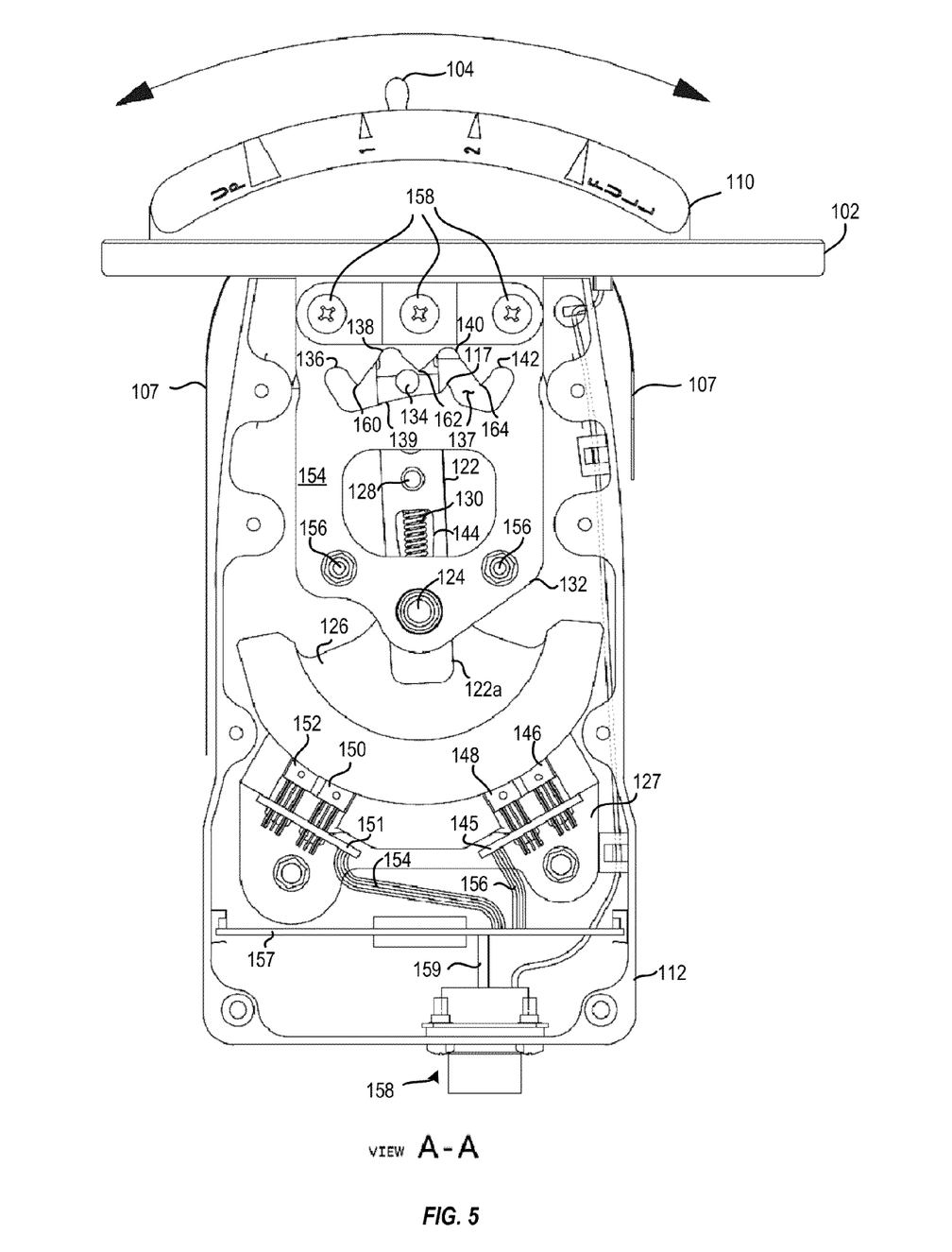
FIG. 5 includes a schematic cross-sectional diagram taken along line A-A of FIG. 2, with the module in transit between positions such that the aircraft flaps are in transit to a new set position, according to some exemplary embodiments.

Referring to FIG. 4, engagement pin 134 is in engagement with engagement groove 142, which, as described above, is associated with aircraft flaps FULL position. As a result, with flap position handle-command module 100 in this configuration, the aircraft flaps will be commanded to FULL for the fully extended positio FIG. 5 is a schematic cross-sectional diagram taken along line A-A of FIG. 2, with the module 100 in transit between positions such that the aircraft flaps are in transit to a new set position, according to some exemplary embodiments. All of the elements of FIG. 5 are the same as those of FIGS. 3 and 4, as indicted by the like reference numerals. Accordingly, detailed description of those like elements will not be repeated.

Referring to FIG. 5, because shifter lever 122 is in transit between positions, engagement pin 134 is not in engagement with any of engagement grooves 136, 138, 140,142. As a result, flap knob 104 and shifter lever 122 are depressed against the bias of compression spring 130, as illustrated by the reduced amount of flap knob 104 exposed above slot side 110 and the increased amount of distal end 122a of shifter lever 122 exposed beyond detent plate assembly 132. However, in accordance with the exemplary embodiments, when any releasing force applied to flap knob 104 is removed such that module 104 is allowed to return to a rest quiescent state, compression spring 130 and the pointed and sloped side 160 of engagement groove 138 will force engagement pin 134 into engagement with engagement groove 138. As a result, the aircraft flaps will be commanded to flap position 1. This self-centering and self-engagement of the exemplary embodiments will occur automatically with no external intervention other than removal of any releasing force which may be presently applied against the biasing force of compression spring 130. That is, the user/pilot will not need to move or "hunt" with flap knob 104 to find flap position 1. According to the self-centering action of the exemplary embodiments, that will be accomplished automatically.

Figure 6:
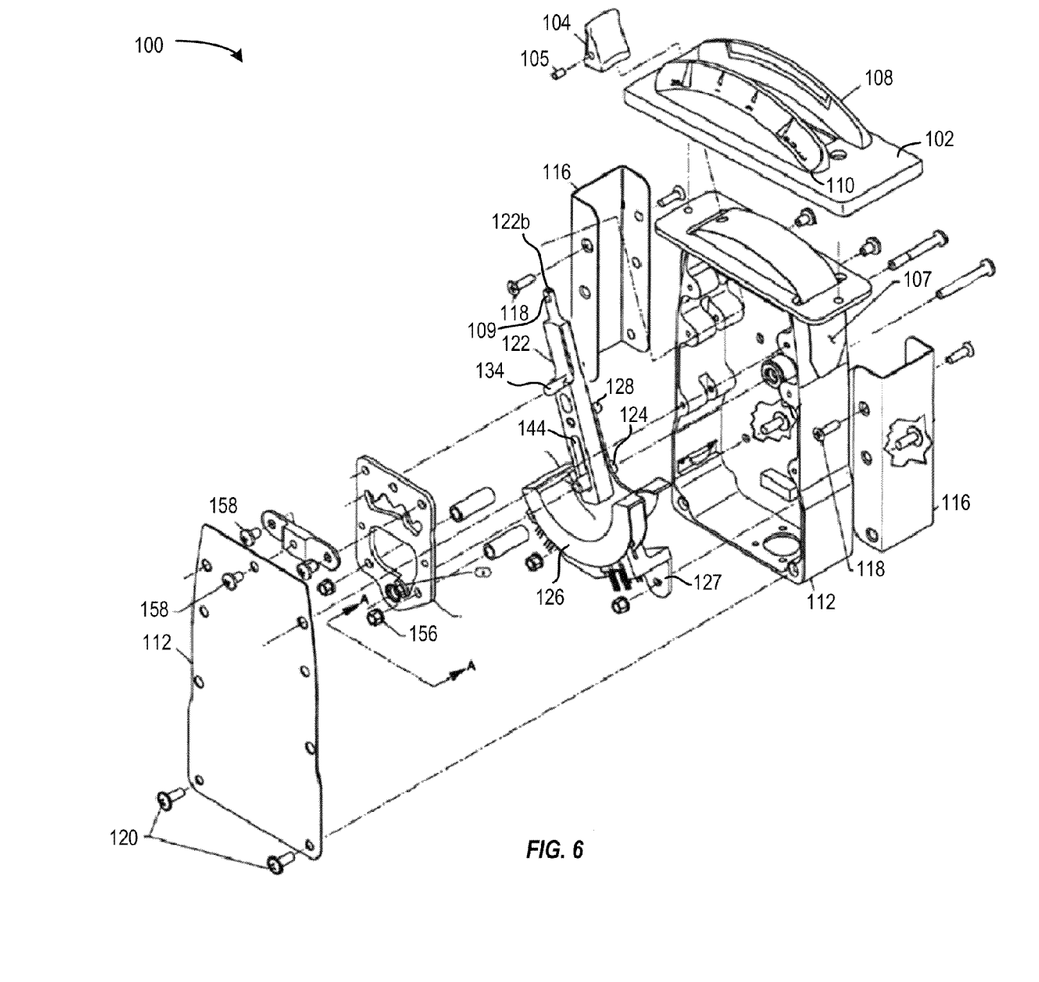
FIG. 6 includes a schematic exploded isometric view of the flap position handle-command module, according to some exemplary embodiments.

FIG. 6 includes a schematic exploded isometric view of the flap position handle-command module, according to some exemplary embodiments. Most of the elements of FIG. 6 are the same as those of FIGS. 3, 4 and 5 as indicated by the like reference numerals. Accordingly, detailed description of those like elements will not be repeated. Referring to FIG. 6, shifter lever 122 is fixedly attached to flap knob 104 by a set screw 105, which is applied to a flat portion 109 at a proximal end 122b of shifter lever 122.

While the present disclosure has shown and described exemplary embodiments, it will be understood by those of ordinary skill in the art that various changes in form and details may be made therein without departing from the spirit and scope of the present disclosure, as defined by the following claims.

I claim:

1. An apparatus for controlling positioning of flaps in an aircraft, comprising:
a depressable shift lever downwardly movable to each of a plurality of shift lever positions to control positioning of the flaps of the aircraft to each of a respective plurality of associated flap positions;
a shift lever indexing plate comprising a plurality of engagement positions associated with the plurality of shift lever positions, respectively, the shift lever being coupled to an engagement member, the engagement member moving downward with the shift lever and being upwardly biased such that when the shift lever is depressed, the engagement member is able to selectively engage a selected one of the plurality of the engagement positions associated with a selected one of the shift lever positions to command the aircraft flaps to the flap position associated with the selected one of the shift lever positions;
the shift lever indexing plate further comprises a web portion which separates the engagement positions of the shift lever indexing plate, the web portion being shaped with pointed and sloped sides forming engagement grooves and the shift lever carrying a pin to engage the engagement grooves and the shift lever being biased by a biasing member such that when the shift lever is at rest and only the shift lever bias is applied to the shift lever, the engagement member must be engaged with one of the plurality of engagement positions of the shift lever indexing plate; wherein
the web portion comprises a flat section opposite a plurality of engagement grooves for moving the shift lever pin directly between non-adjacent engagement grooves while the shift lever is moved downward;
a safety protrusion that prevents the shift lever pin from moving to an engagement groove associated with a fully extended flap position without first engaging in an immediately adjacent engagement groove; and
a plurality of optical sensors corresponding to the plurality of shift lever positions for sensing the shift lever positions based on a beam blocker mechanically coupled to the shift lever for pivoting when the shift lever is moved.

2. The apparatus of claim 1, wherein the apparatus includes four shift lever positions.

3. The apparatus of claim 1, wherein the aircraft includes four flap positions.

4. The apparatus of claim 1, wherein the web portion of the shift lever indexing plate comprises a safety protrusion opposite the engagement grooves which interferes with the shift lever pin to ensure the shift lever moves from a first shift lever position to a second shift lever position before moving to a third shift lever position.

5. The apparatus of claim 4, wherein one of the first and third shift lever positions is associated with a flap position in which the aircraft flaps are fully extended.

6. The apparatus of claim 1 wherein the biasing member is elastically-compressible.

7. The apparatus of claim 6 wherein the elastically-compressible biasing member is a spring.

8. An apparatus for controlling positioning of flaps in an aircraft, comprising:
a depressable shift lever downwardly movable to each of a plurality of shift lever positions to control positioning of the flaps of the aircraft to each of a respective plurality of associated flap positions; and
a shift lever indexing plate comprising a plurality of engagement positions associated with the plurality of shift lever positions, respectively, the shift lever being coupled to an engagement member, the engagement member moving downward with the shift lever and being upwardly biased such that when the shift lever is depressed, the engagement member is able to selectively engage a selected one of the plurality of the engagement positions associated with a selected one of the shift lever positions to command the aircraft flaps to the flap position associated with the selected one of the shift lever positions; wherein the shift lever indexing plate further comprises a web portion with pointed separators which distinctly separate the engagement positions of the shift lever indexing plate, the web portion of the shift lever indexing plate comprising a flat section opposite a first engagement position and a second engagement position that allows the engagement member to move directly between a first shift lever position past a second shift lever position to a third shift lever position, and a safety protrusion opposite a third engagement position which interferes with the engagement member to ensure the shift lever moves from the second shift lever position to the third shift lever position before moving to a fourth shift lever position;

a plurality of optical sensors corresponding to the plurality of shift lever positions for sensing the shift lever positions based on a beam blocker mechanically coupled to the shift lever for pivoting when the shift lever is moved.

9. The apparatus of claim 8, wherein one of the first and third shift lever positions is associated with a flap position in which the aircraft flaps are fully extended.

10. The apparatus of claim 8, wherein the apparatus includes four shift lever positions.

11. The apparatus of claim 8, wherein the aircraft includes four flap positions.

12. The apparatus of claim 8, wherein the bias on the shift lever is provided by a spring.

13. The apparatus of claim 8, wherein the engagement positions of the shift lever indexing plate are defined by grooves formed in the shift lever indexing plate.

14. The apparatus of claim 13, wherein the engagement member comprises a pin carried by the shift lever, the pin engaging the grooves in the shift lever indexing plate.

15. The apparatus of claim 8, wherein the engagement member comprises a pin carried by the shift lever, the pin engaging grooves in the shift lever indexing plate.

16. An apparatus for controlling positioning of flaps in an aircraft, comprising:

a shift lever downwardly movable to each of a plurality of shift lever positions to control positioning of the flaps of the aircraft to each of a respective plurality of associated flap positions;

a shift lever indexing plate comprising a plurality of engagement positions associated with the plurality of shift lever positions, respectively, the shift lever being coupled to an engagement member, the engagement member moving downward with the shift lever and being upwardly biased such that when the shift lever is depressed, the engagement member is temporarily dislodged and able to selectively find and engage one of the plurality of the engagement positions associated with a selected one of the shift lever positions to command the aircraft flaps to the flap position associated with the selected one of the shift lever positions; and a plurality of optical sensors corresponding to the plurality of shift lever positions for sensing the shift lever positions based on a beam blocker mechanically coupled to the shift lever for pivoting when the shift lever is moved.

* * * * *